INVENTORS:
E. G. NIELSEN,
S. P. W. STRANDDORF,
BY *Marvin L. Goldenberg*
THEIR ATTORNEY.

United States Patent Office 3,392,236
Patented July 9, 1968

3,392,236
AUTOMATIC BEAM CONTROL FOR
CAMERA TUBE
Edward G. Nielsen, Baldwinsville, N.Y., and Søren Peter
W. Stranddorf, Vaerloese, Denmark, assignors to General Electric Company, a corporation of New York
Filed Oct. 19, 1964, Ser. No. 404,778
15 Claims. (Cl. 178—7.2)

ABSTRACT OF THE DISCLOSURE

The invention relates to an automatic beam control system for camera tubes of the return beam read out type. The system includes a double loop feedback circuit connected between the tube output electrode and control grid, which feedback circuit includes a comparator network in which the beam current component of the signal at the tube output electrode is effectively cancelled out so that a control signal that is primarily a function of the target current is applied to the control grid.

---

This invention relates to automatic beam control systems for controlling the beam current in a television camera tube and, more particularly, to a novel system of this type which employs feedback circuitry in association with the camera tube for proving an essentially instantaneous control of the beam current in accordance with the elemental intensity of the applied light information. The system has principal application to television camera tubes of the return beam read out type, such as the image orthicon tube and the IR vidicon tube.

Briefly, in conventional return beam read out camera tube operation, beam current of a constant intensity (normally determined by the brightest picture element of the input light) is scanned over the surface of a target electrode to which has been applied a latent electrostatic image of the input light information. In the scanning process, a fraction of the electrons of the incident electron beam are deposited on the target for neutralizing the positive differential charge of the electrostatic image. Without considering the secondary effects of noise, etc., the remaining electrons of the beam are reflected back to an anode electrode, from which the output of the tube is taken. Accordingly, the output tube current is modulated in accordance with the light information applied to the tube.

The generation of a constant beam current for televising a scene of a given light level imposes a minimum of complexity in the electronic circuitry associated with the camera tube and for this reason is commonly employed in essentially all image orthicon cameras in existence today. However, the ability of cameras of constant beam current to adapt to light of high bright to dark contrast is very much limited. Stated in other terms, the latitude of these cameras, which may be defined as the ratio of the highest light intensity to the lowest light intensity within a scene to which the camera will respond, is limited. The limitation is most severe for low level light. For example, at average light intensities into the tube between about $10^{-4}$ and $10^{-5}$ foot-candles, conventional cameras of constant beam current have a latitude on the order of 10.

The limitation in latitude arises from the fact that for excessively bright picture elements there is insufficient beam current available for neutralizing the charge on elemental areas of the target corresponding to said bright picture elements. Therefore, charge builds up and spreads across the target causing a condition known as "blooming." Conversely, for excessively dark picture elements the signal level is on the order of the noise, which is proportional to the beam current. The condition of blooming may completely obliterate a substantial area of the image and cannot be tolerated to any appreciable degree. In practice, blooming is normally avoided by setting the constant current beam at a value corresponding to the brightest anticipated picture element. However, this is not always a satisfactory solution because unless the input light is of a relatively low contrast, much of the dark picture element information may be lost. Accordingly, although for a uniform (low contrast) illumination, such as in a well lighted TV studio, fixed beam cameras of present day performance are adequate, for numerous applications where light conditions are not or cannot be uniform, they are often inadequate.

A number of attempts have been made in the prior art to improve the latitude of return beam read out cameras by controlling the tube beam current as a function of light input, either on an essentially instantaneous or frame average basis. For an instantaneous control one known approach has been to feed back the output signal appearing at the tube anode through an appropriate feedback path to the control grid in order to control the tube grid voltage, and therefore the beam current, as a function of the output anode current. Insofar as known, none of the prior art circuits has been successful in extending the latitude to any appreciable degree. In addition, the feedback schemes that have been attempted to provide an instanteous control have tended to be unstable.

The present invention accomplishes to a very considerable extent that which the prior art has failed to accomplish. In particular, up to one thousandfold improvement in latitude has been achieved with the present feedback circuit over constant beam camera operation.

It is accordingly a primary object of the invention to provide an automatic beam control system for return beam read out camera tubes which on an essentially instantaneous basis controls the tube beam current as a function of picture element light intensity so as to appreciably improve the latitude of the camera system.

It is a further object of the invention to provide an automatic beam control system of the above described type which is completely stable in its operation.

It is a still further object of the invention to provide an automatic beam control system of the above described type that employs a novel feedback circuit which operates on the tube output current so as to feed back to the tube control grid a control signal that is primarily a function of the input light information and independent of the beam current.

Briefly, these and other objects of the invention are accomplished in an automatic beam control system employing a novel feedback circuit in combination with a return beam read out camera tube wherein appearing at the tube output and applied to the feedback circuit is a current proportional to the tube anode current $I_a = \alpha(I_b - I_t)$, where $\alpha$ is the tube electron multiplier amplification factor $I_b$ is the generated beam current and $I_t$ is the target current, or the discharge current flowing from the target as the beam is scanned across. By means of the feedback circuit the beam current $I_b$ component of the anode current $I_a$ is at least partially cancelled out so as to derive a control signal that is primarily a function of the target current, the control signal being supplied by the feedback circuit to the tube control grid for generating within the tube a beam current that follows the target current excursions.

The feedback circuit is of the type having a finite forward and backward transfer function, and more specifically includes a primary feedback loop closed by the electron path through the tube and a secondary feedback loop having a portion common to said primary loop. A comparator network is provided in the primary feedback loop having applied as a first input thereto a signal proportional to $I_a$ and as a second input thereto a signal proportional to $I_b$, the second input being fed back from the comparator output by means of the secondary feedback loop. The second input is related in phase and magnitude to the first input so as to at least partially cancel out the $I_b$ component in the comparator network output. From the output of the comparator network is derived the control signal that is applied to the control grid for controlling the beam current, which signal is a function of $I_t/m$, where $m < M_{max}$ $m$ is a multiplication factor which is equal to the ratio $I_t/I_b$ on a steady state basis. $M_{max}$ is the maximum modulation index equal to $I_t/I_{b\ min}$, where $I_{b\ min}$ is the minimum beam current required for supplying the necessary $I_t$ for a given light intensity. The noise of the system increases as $m$ is decreased, and the speed of the system response decreases as $m$ is made to approach $M_{max}$. The value of $m$ is selected with regard to above presented criteria. In order that the feedback circuit be stable in its operation, it is necessary that the characteristic equation for the control system transfer function $I_b/I_t$ should have no poles in the right half plane in accordance with established stability criteria. One method for achieving the proper transfer function $$I_b/I_t = \frac{1}{m}$$

is for the open loop gain of the primary loop $k_1$ to be made equal to $$\frac{K-1}{m}$$

and the open loop gain of the secondary loop $k_2$ to be made equal to $$\frac{(m-1)K+1}{m}$$

where $K$ is the open loop gain of the feedback circuit as referred to in the recited common portion. The value of $K$ is selected so as to satisfy the stability criteria.

In a preferred operating embodiment $K=0$ so that the open loop gains of the primary and secondary feedback loops are made to be substantially equal in magnitude and opposite in phase, whereby $$k_1 = -\frac{1}{m} \text{ and } k_2 = \frac{1}{m}$$

In this embodiment the $I_b$ component of the anode current $I_b$ is substantially cancelled out in the feedback circuit so as to derive a control signal that is independent of the beam current and solely a function of the target current, thereby providing good stability and optimum response time for the system.

While the specification concludes with claims particularly pointing out and distinctly claiming the subject matter which is regarded as the invention, it is believed the invention will be better understood from the following description taken in connection with the accompanying drawings in which:

Figure 1:
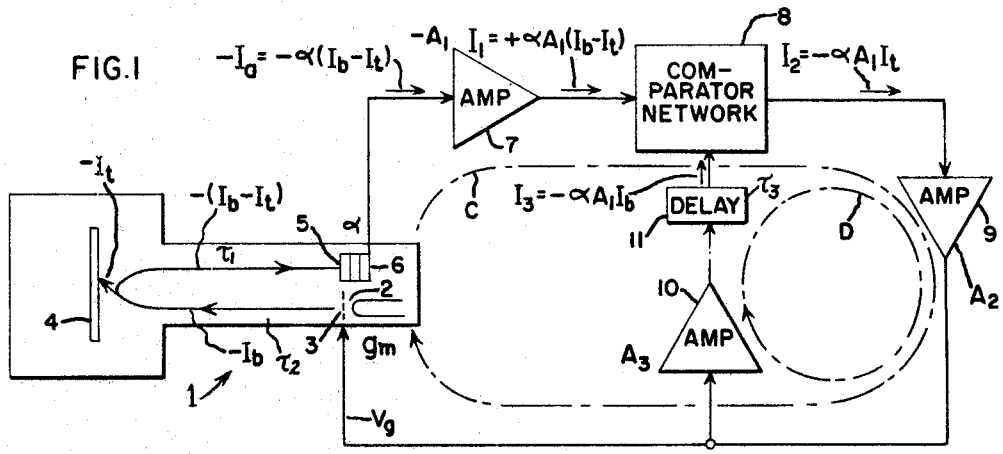
FIGURE 1 is a functional schematic diagram of the automatic beam control circuit of the present invention.

Referring now in detail to the figures of the drawing and in particular to FIGURE 1, there is illustrated a functional schematic diagram of the automatic beam control system of the present invention. The system includes a return beam read out camera tube 1, typically an image orthicon tube, in combination with a wide bandwidth feedback circuit for providing an essentially instantaneous control of the tube beam current. The camera tube 1 is shown to include an electron gun assembly 2, a control grid 3, a target electrode 4, an electron multiplier 5 and an anode electrode 6. An inherent delay $\tau_1$ is introduced to the beam current between the target electrode 4 and the anode electrode 6, and a delay $\tau_2$ is introduced between the gun assembly 2 and the target 4.

The feedback circuit forms a primary feedback loop and a secondary feedback loop. The primary feedback loop includes a feedback path coupling the anode electrode 6 to the control grid 3 and comprising serially connected in the order recited a first amplifier network 7, a comparator or summing network 8 and a second amplifier network 9. The primary feedback loop, which is closed by the electron path through the tube, is designated in FIGURE 1 by broken line C. The output of amplifier 9, in addition to being connected to the control grid 3, is also coupled through a third amplifier network 10 and a delay member 11 of delay time $\tau_3$ as a second input to the summing network 8. There is thus formed the secondary feedback loop designated by the broken line D, including comparator network 8, amplifiers 9 and 10 and delay member 11. The delay $\tau_3$ is normally made equal to $\tau_1 + \tau_2$. It may be assumed for purposes of explanation that the remainder of the circuit is either without significant delay or that existing circuit delays are lumped into $\tau_1$, $\tau_2$ and $\tau_3$.

The transconductance of the camera tube is $g_m$, considered to be a linear function in the schematic circuit of FIGURE 1. The maximum modulation index of the tube is $M_{max}$, which is a measure of the tube efficiency and equal to $I_t/I_{b\ min}$, $I_{b\ min}$ being the minimum beam current required for a given current $I_t$. The amplification factor for the electron multiplier 5 is $\alpha$. The tube anode current $I_a$ is equal to $\alpha(I_b - I_t)$, $I_b$ being the generated beam current. Amplifier 7, amplifier 9 and amplifier 10 are selected to have individual transfer characteristics of $-A_1$, $A_2$ and $A_3$, respectively.

The generated beam current $I_b$, the target current $I_t$, the reflected current $I_b - I_t$ and the anode current $I_a$ are identified in FIGURE 1 as negative quantities because of their given directions. In addition to these currents, there are illustrated two input currents to the comparator network 8, $I_1$ and $I_3$, and an output current $I_2$, these currents to be discussed in greater detail subsequently.

The circuit characteristic equation as related to the diagram of FIGURE 1 can be written as:

$$\frac{I_b}{I_t} = \frac{-\alpha A_1\ g_m\left(\frac{A_2}{1-A_2A_3}\right)}{1-\alpha A_1\ g_m\left(\frac{A_2}{1-A_2A_3}\right)} \quad (1)$$

The amplifier transfer characteristics of the feedback circuit are assigned values such that (1) the circuit characteristic equation has no poles in the right half plane so as to ensure circuit stability; and (2) the requisite regulation characteristic is provided, i.e., $$I_b/I_t = \frac{1}{m}$$

where $m$ is a circuit multiplication factor having a value less than $M_{max}$. Normally $m$ is constant for a given dynamic range of input light intensities. However, it need not be so limited and for some operations it may be desirable to vary $m$ as a function of one or more parameters of the system.

Thus, in the circuit of FIGURE 1 the target current varies as a function of the light intensity of the input light picture elements, and by means of the feedback circuit regulation characteristic the beam current $I_b$ is made to follow the target current. On an essentially instantaneous basis, $I_b$ is maintained at a value slightly greater than $I_{b\,min}$, the beam current required to fully discharge the target.

As will be more completely explained presently, in the preferred operation the individual open loop gains of the primary and secondary loops C and D are set essentially equal in magnitude and opposite in phase. This provides the fastest equilibrium response for the control circuit and the most accurate output, in addition to maintaining the requisite circuit stability. To match the two loops $A_2$ is set equal to $1/\alpha A_1 m\, g_m$ and $A_3$ is set equal to $\alpha A_1\, g_m$. Accordingly, $I_1 = \alpha A_1(I_b - I_t)$, $I_2 = -\alpha A_1 I_t$ and $$I_3 = -\alpha A_1 I_b$$

where $I_b = g_m V_g$.

In return beam read out camera tubes of the type illustrated, a differential electrostatic charge distribution of a positive nature is formed on the target electrode 4 in conformance with an optical input. In an image orthicon camera tube the charge distribution is formed by the bombardment of the target by electrons emitted from a photocathode, not shown, and a resulting secondary emission from the target. A focused electron beam is generated by the gun assembly 2 and scanned over the target surface by appropriate focusing and scanning assemblies, not shown. As the beam is scanned, a portion of the electrons constituting the beam are directed to the target in an amount necessary for neutralizing the elemental target charge. Neglecting noise effects, etc., the remaining electrons of the beam are reflected and directed to the electron multiplier 5 and anode electrode 6.

In conventional camera tubes of the type in interest, the beam current $I_b$ may have its setting changed by the camera tube operator for differing light levels. However, for a given light level scene it is normally maintained constant and is established at the upper limit of the light intensity of that scene. This may be better understood by considering FIGURE 2.

Figure 2:
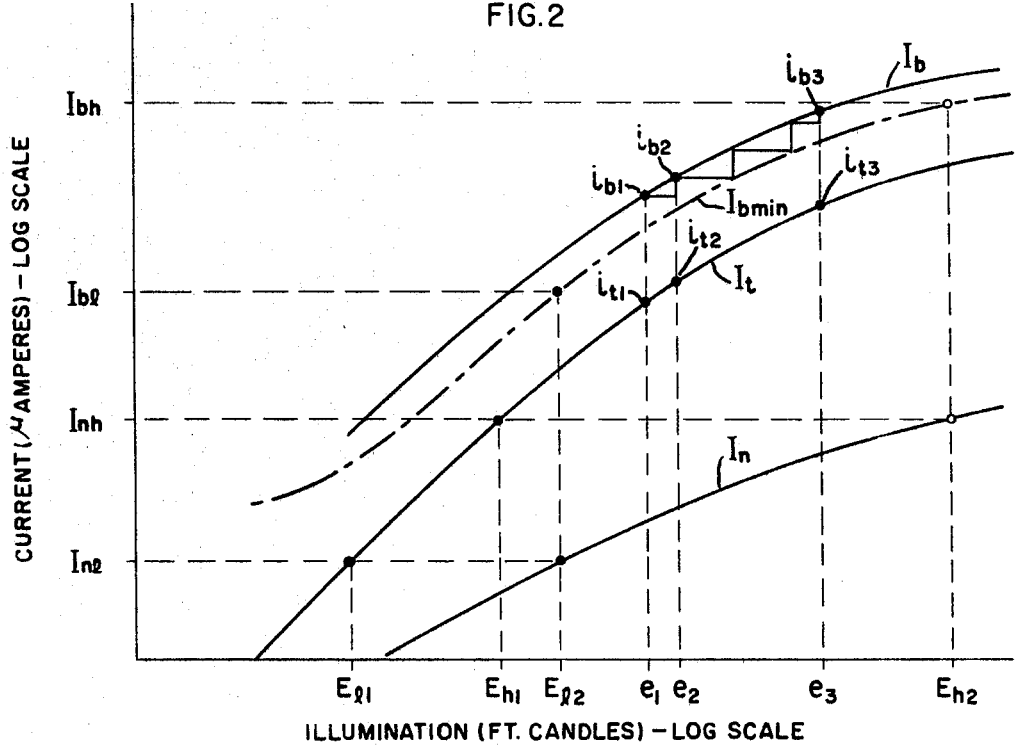
FIGURE 2 is a set of curves presenting the light transfer and noise characteristics of a camera tube such as may be employed in the circuit of FIGURE 1 and useful in explaining the operation thereof.

In FIGURE 2 are shown the light transfer characteristics and noise characteristics of a camera tube of the type to which the instant invention has application. Specifically, there is plotted on a logarithmic scale current I in microamperes along the ordinate axes versus illumination E in foot-candles along the abscissa axes for $I_b$, $I_{b\,min}$, $I_t$ and $I_n$, the latter being equal to the root mean square of the tube noise. From the curve $I_t$ it is seen how the target current varies as a function of picture element light intensity. $I_{b\,min}$ is the curve of the minimum generated beam current required for sustaining the requisite target current at various light intensities. From the two curves $I_{b\,min}$ and $I_t$, it may be seen that over a wide range of high intensity illumination $I_t/I_{b\,min}$ or $M_{max}$ is approximately constant, the value of $M_{max}$ being primarily a function of the tube characteristics. $I_b$ is a curve of the actual beam current generated in the camera tube, the instantaneous value of $I_b$ being controlled by the feedback circuit of the present invention. In accordance with the invention, the values are somewhat greater than $I_{b\,min}$ for reasons to be explained presently. $I_n$ is a curve of the tube noise and is primarily a function of $I_b$.

Let there be considered now the operation of a conventional tube of some constant beam current, e.g., $I_{b1}$. It will be seen that this beam current has a corresponding noise level of $I_n$ and provides operation over a low light level, between $E_{l1}$ and $E_{l2}$. Typical values for $E_{l1}$ and $E_{l2}$ are about $10^{-5}$ and $10^{-4}$, respectively. At the lower end of this light range, at $E_{l1}$, the beam noise is equal to the signal, providing a signal to noise ratio of 1 which as a figure of merit may be said to define the lower limit of tube operation. The upper limit is established at $E_{l2}$. Beyond that light intensity there is insufficient beam current available for supplying the target current required to neutralize the positive charge on the target and blooming results.

It may be seen that to capture light of high intensity, for example, between $E_{h1}$ and $E_{h2}$, a second generated beam current, e.g., corresponding to $I_{bh}$ must be employed. Thus, for light intensities below $E_{h1}$ the signal to noise ratio is less than 1, and for light intensities above $E_{h2}$, insufficient beam current is available to supply the requisite target currents and blooming occurs. Typical values for $E_{h1}$ and $E_{h2}$ are about $10^{-4}$ and $10^{-2}$, respectively.

It may accordingly be seen that for a constant beam operation, two primary constraints determine at precisely what intensity the beam is maintained. The principal constraint is the necessity to avoid any appreciable blooming, and the other is to maintain the highest possible signal to noise ratio. Selection of the appropriate beam current intensity, although somewhat of a compromise between the two conflicting constraints, is primarily dictated by the first one.

For a given range of light, the ratio of the upper limit light intensity to the lower limit light intensity to which a camera will properly respond is termed the latitude of the camera and for a constant beam current is determined principally by the tube characteristics. Thus, the latitude of a camera is fixed for a given range of light, but it will vary for different light ranges, as can be seen from an examination of FIGURE 2. Thus, $E_{l2}/E_{l1}$ is appreciably less than $E_{h2}/E_{h1}$. It may be appreciated that serious difficulty arises, with respect to the employment of a constant current beam, in instances where the range of light intensities of a light input is too large to be accommodated by the camera beam current. For such condition an increase in latitude is required over that which exists for a constant current beam.

It can be understood from the curves of FIGURE 2 that by varying the beam current in step with the target current, the blooming and signal to noise ratio constraints are considerably eased and an appreciable improvement in latitude may be provided. An optimization of this operation is to control the beam current so as to follow the $I_{b\,min}$ curve, which is only theoretically possible. The lower limit is then no longer determined principally by the beam noise but rather by the noise of the associated electrical circuitry. The upper limit is determined by the inherent optical and electronic properties of the tube. The present invention approaches the above described optimum operation in supplying a beam current that is essentially instantaneously varied as a function of the target current. However, the beam current $I_b$ is maintained slightly higher than $I_{b\,min}$, which is necessary in order to allow for tracking of the target signal to take place.

There will now be considered the operation of the circuit of FIGURE 1 constructed so that the transfer characteristics of the primary and secondary feedback loops C and D are equal in magnitude but opposite in phase. If it is first assumed that the beam in its travel is at a given instant focused upon a given picture element of intensity $e_1$, there will be a corresponding target current $i_{t1}$ and a corresponding beam current $i_{b1}$, which are indicated in FIGURE 2. For as long as the beam is scanned across target elements of intensity $e_1$ the beam current will remain at intensity $i_{b1}$. Accordingly, the anode current $I_a$ in the circuit of FIGURE 1 is equal to $\alpha(i_{b1} - It_1)$ and remains constant. In tracing around the feedback loops, it is seen that at the first input $I_1$ to comparator network 8 is equal to $\alpha A_1(i_{b1} - i_{t1})$. The second input $I_3$ is equal to $-\alpha A_1 i_{b1}$ of the same magnitude but opposite polarity to the corresponding component of the first input for cancelling out this component. Summation of the two quantities performed in the network 8 provides at the output $I_2$ equal to $-\alpha A_1 i_{t1}$. The output of network 8 is operated on by amplifier 9 to provide a voltage $v_g$. When applied to the control grid 3 of tube 1, $v_g$ provides a beam current of, in this instance, $i_{b1}$. It is seen that the output of amplifier 9 is also operated upon by amplifier 10 to derive the second input to comparator network 8.

If it is next assumed that the beam is focused on a picture element of intensity $e_2$, where $e_2$ is greater than $e_1$, there will be a corresponding increase in target current $i_{t2}$. At this point in time the beam current has not changed and remains as $i_{b1}$. There then follows a decrease in the anode current $I_a$. As before in the comparator network 8 the $i_{b1}$ component is cancelled out and a signal proportional to $i_{t2}$ appears at the output thereof, which is in turn applied to the control grid 3 for changing the beam current to $i_{b2}$ and to the second input of the comparator network to correspondingly change this value.

The process may be appreciated to be similar for reductions in $I_t$, where lower intensity picture elements are encountered. Thus, in the manner described, the beam current is made to closely follow the target current through its modulation excursions.

It should be pointed out that when considering scanning from lower light intensity picture elements to higher light intensity picture elements, where the target current differential between target elements is less than the difference between the actual beam current and the minimum beam current, the beam current will adjust to its new value in a single step after one pass around the feedback circuit, as above described. However, where the target current differential between target element is greater than the difference between the actual beam current and the minimum beam current, there will be required more than one traversal of the feedback path for establishing the new beam current, the number of traversals depending upon how much greater the target current differential is than the beam current differential. Thus, if the beam scans from a target element corresponding to an illumination of $e_2$ to a target element corresponding to an illumination of $e_3$ where $i_{t3}-i_{t2}$ is seen to be considerably greater than the difference between $i_{b2}$ and its corresponding minimum beam current, the beam current climbs to its requisite value $i_{b3}$ in a series of steps as illustrated in FIGURE 2, each step corresponding to one traversal of the feedback circuit. It may be seen that determination of the $I_b$ curve represents a compromise between the speed and accuracy with which the actual beam current is able to follow the requisite target current, and the signal to noise ratio of the output signal. Thus, the further displaced is the $I_b$ curve from the $I_{b \, min}$ curve, i.e., the smaller is $m$, the closer the tracking of the target signal by the beam current but the greater the noise. The closer the $I_b$ curve is to the $I_{b \, min}$ curve, or the larger is $m$, the less the noise but the more difficult is it for the beam current to readily track the target current.

The regulation and stability characteristics of the feedback circuit of the present invention employing a primary and a secondary feedback loop, as well as a comparison with the prior art form of feedback circuit employing only a single feedback path, is mathematically demonstrated below.

The circuit characteristic equation for the block diagram of FIGURE 1 has been expressed as:

$$\frac{I_b}{I_t} = \frac{-\alpha A_1 \, g_m \left(\frac{A_2}{1-A_2 A_3}\right)}{1 - \alpha A_1 \, g_m \left(\frac{A_2}{1-A_2 A_3}\right)} \quad (1)$$

Since it has been shown that regulation of the beam current requires that:

$$\frac{I_b}{I_t} = \frac{1}{m} \quad (2)$$

the left hand side of equation (1) may be replaced by the expression $1/m$ to yield the following equation:

$$\frac{1}{1-m} = \alpha A_1 \, g_m \left(\frac{A_2}{1-A_2 A_3}\right) \quad (3)$$

It may be appreciated that for a single loop feedback circuit $A_3 = 0$ so that Equation 3 reduces to:

$$\frac{1}{1-m} = \alpha A_1 A_2 \, g_m \quad (4)$$

Equations 3 and 4 represent the conditions that the double loop circuit and the single loop circuit, respectively, must fulfill in order to obtain the desired regulation of Equation 2.

With respect to the stability characteristics, the open loop gain K of the double loop circuit referenced to the common portion of the circuit of FIGURE 1 may be written as:

$$K = A_2(\alpha A_1 g_m + A_3) \quad (5)$$

From Equation 5 it may be seen that the primary loop open loop gain $k_1$ is $\alpha A_1 A_2 \, g_m$ and the secondary loop open loop gain $k_2$ is $A_2 A_3$.

For $A_3 = 0$ Equation 5 reduces to:

$$K' = \alpha A_1 A_2 \, g_m \quad (6)$$

by combining Equations 4 and 6 there results:

$$K' = \frac{1}{1-m} \quad (7)$$

since $m$ is less than 1, $K'$ will be greater than 1 and the loop is regenerative and unstable. Thus, there cannot be realized a single feedback loop that yields the required regulation and is at the same time stable.

If the double loop circuit Equations 3 and 5 are combined there may be expressed the equation:

$$A_2 A_3 = \frac{1-(1-m)K}{m} \quad (8)$$

It may be seen from Equation 8 that with the two feedback loop circuit one of the quantities $A_2 A_3$ or K may be chosen and the other will be determined thereby. As will be considered in detail, a preferable choice from the standpoint of stability and optimum operation is to set $K=0$ so that the individual open loop gains $k_1$ and $k_2$ are equal in magnitude and opposite in phase. Then $$A_2 A_3 = \frac{1}{m}$$

and from Equation 5 $A_3 = -\alpha A_1 g_m$. Substituting in Equation 8

$$A_2 = -\frac{1}{m \alpha A_1 \, g_m}$$

Therefore, the primary open loop gain $$k_1 = -\frac{1}{m}$$

and the secondary open loop gain $$k_2 = \frac{1}{m}$$

The two feedback loop circuit is stable since $K=0$, and the required regulation characteristic is obtained.

In the above explanation the delay times of the two loops are assumed to be equal, or that $\tau_3 = \tau_1 + \tau_2$, so that, for simplicity, phase terms are not included in the equations presented. However, it should be understood that for other than relatively low frequency operation when the circuit delays are not significant, the relative phase as well as magnitude of the primary and secondary feedback loop gains are important in determining the value of K.

As has been stated, in the preferred operation the open loop gains are adusted in magnitude and phase so that K is approximately equal to zero. The term "approximate" is used because it is not in practice feasible to obtain a precise match between the two open loop gains. It is important to note, however, that as long as K satisfies the stability criteria, it may have numerous values other than zero, between +1 and −1 and theoretically even beyond, and there still be maintained an instantaneous beam control within the scope of the present invention. In general, it may be said that the more the value of K is offset from zero, the slower is the equilibrium response time of the circuit and the less accurate the output signal, and the more difficult is it to maintain circuit stability. With respect to the response time characteristic, another way this may be considered is that as the value of K is made to differ from zero, the bandwidth of the control response becomes increasingly narrow, or the response peaks.

A comparison of the circuit operation for different values of K will be described in detail. Equation 1 may be readily re-written as:

$$\frac{I_b}{I_t} = \frac{-\alpha A_1 A_2 g_m}{1-(A_2 A_3 + \alpha A_1 A_2 g_m)} \quad (9)$$

By substituting from Equations 2 and 5 in Equation 9 the following are obtained:

$$\alpha A_1 A_2 g_m = \frac{K-1}{m} \quad (10)$$

and $$A_2 A_3 = \frac{(m-1)K+1}{m} \quad (11)$$

Figure 3:
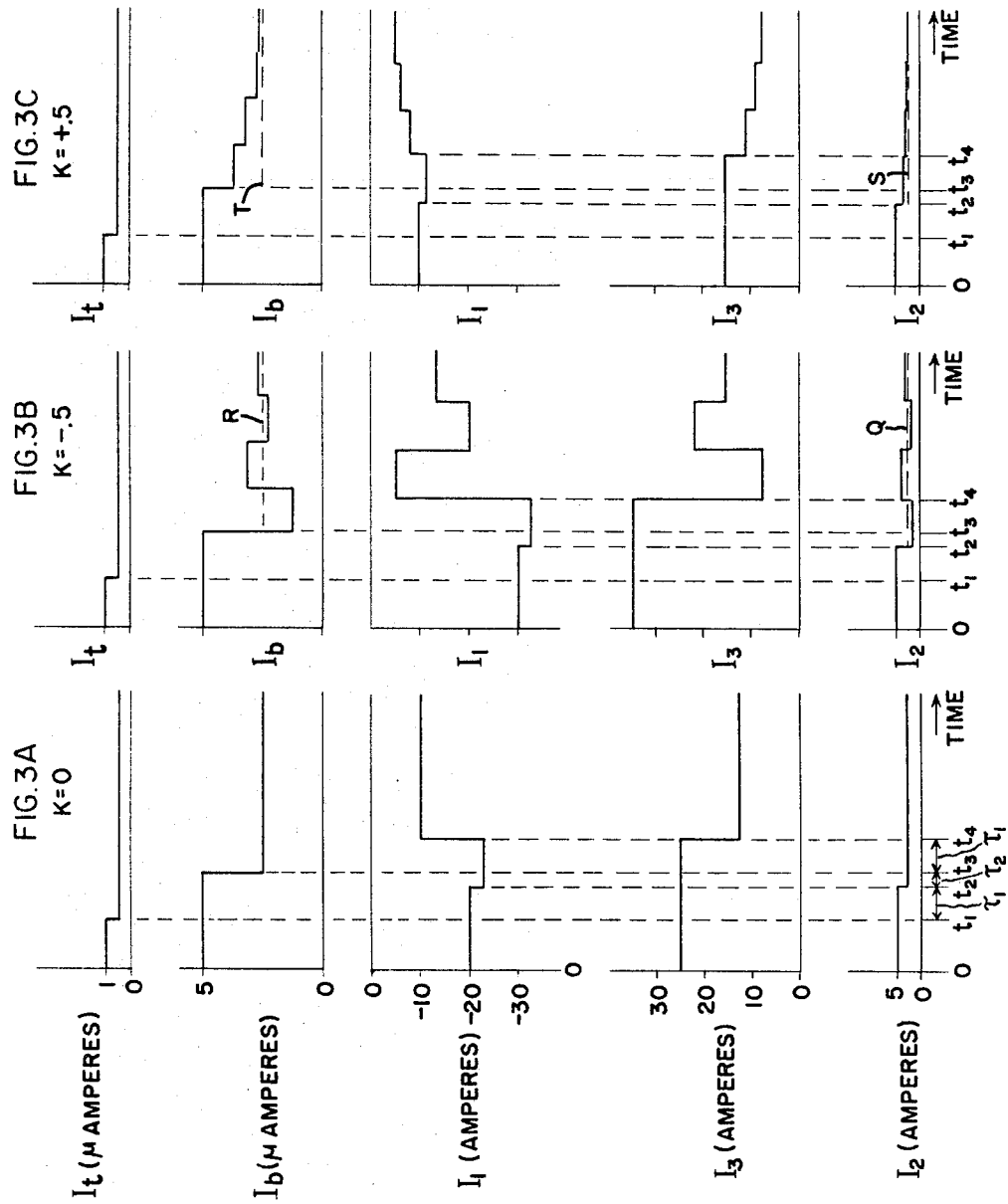
FIGURES 3A, 3B and 3C are sets of waveforms illustrating various exemplary operations for the circuit of FIGURE 1.

By assigning arbitrary values to the parameters of Equations 10 and 11 typical waveforms for the various currents $I_t$, $I_b$, $I_1$, $I_2$ and $I_3$ flowing in FIGURE 1 may be plotted. These shown by the graphs of FIGURES 3A, 3B and 3C. The waveforms illustrate typical operations that will occur in the circuit of FIGURE 1 for different values of K. In FIGURE 3A are shown the current waveforms with $K=0$, in FIGURE 3B with $K=-.5$, and FIGURE 3C with $K=.5$.

Accordingly, for purposes of illustration the following values are assigned. These values have been selected as being convenient numbers and are not necessarily typical.

$A_2 = 1$ volt/ampere
$g_m = 10^{-6}$ ampere/volt
$\alpha = 100$
$m = .2$

For the different values of K, values for $A_1$ and $A_3$ can be determined from Equations 10 and 11, and the various instantaneous currents, at different points in time of the circuit operation can then be readily determined by the relationships:

$I_1 = \alpha A_1 (I_b - I_t)$
$I_2 = I_1 + I_3$
$I_b = A_2 I_2 g_m$
$I_3 = A_2 A_3 I_2$ where instantaneous values are inserted for the currents in the above expressions.

Referring to the current waveforms of FIGURE 3A for $K=0$, the target current $I_t$ is assumed to have an initial steady state value of 1 microampere. For the arbitrary values assigned to the circuit parameters, as given above, the initial steady state currents $I_b$, $I_1$, $I_3$ and $I_2$ are 5 microamperes, minus 20 amperes, 25 amperes and 5 amperes, respectively. At time $t_1$, the current $I_t$ is assumed to decrease to a value of .5 microampere. At time $t_2$, after a delay $\tau_1$ which essentially exists between the target electrode 4 and the comparator network 8 input, as indicated with respect to FIGURE 1, the current $I_1$ increases in magnitude for a brief time. At this time the output current $I_2$ decreases to a steady value that is proportional to the new $I_t$ value. After a further delay of $\tau_2$, which essentially exists between the network 8 output and the target electrode 4, at time $t_3$ the current $I_b$ decreases to a second value which is correctly related to the new value of $I_t$ by the factor $m$. At time $t_4$, delayed from $t_3$ by $\tau_1$, $I_1$ decreases in magnitude to a steady value and $I_3$ decreases to a steady value so that the sum of these two currents does not introduce a change in $I_2$. Accordingly, for $K=0$, it may be seen that after a delay of $\tau_1$ from the time the target current changes value, the output current $I_2$ changes its value proportionately.

With reference now to the current waveforms of FIGURE 3B, it will be seen that with K equal to a minus value, in this instance −.5, overshooting occurs in the $I_2$ waveform and there is required a number of successive traversals of the feedback circuit before $I_2$ attains its final steady value. As before, the initial steady state currents are in accordance with the assigned circuit values, i.e., $I_b$, $I_1$, $I_3$ and $I_2$ being equal to 5 microamperes, minus 30 amperes, 35 amperes and 5 amperes, respectively. At time $t_1$ the target current $I_t$ decreases to a second value, as in the previous example. At time $t_2$ the current $I_1$ increases in magnitude, and the output current $I_2$ decreases to a second value. However, because K has a value of −.5, the second value of $I_2$ is seen to be less than its correct value, which is proportional to the new value of $I_t$ and shown by the broken line Q. At time $t_3$, the current $I_b$ changes to a second value, which is seen to be less than its correct value, shown by the broken line R. At time $t_4$, the currents $I_1$ and $I_3$ decrease in magnitude causing an increase in current $I_2$ to a value slightly greater than the correct value. With successive traversals around the feedback loops each occupying a time equal to $\tau_3$, additional fluctuations in $I_b$, $I_1$, $I_3$ and $I_2$ occur until a leveling off to a final steady state occurs.

In FIGURE 3C, the current waveforms are plotted for $K=+.5$. For this operation, it is seen that an overdamped condition prevails. In accordance with the assigned circuit values, the initial steady state currents $I_b$, $I_1$, $I_3$ and $I_2$ are, respectively, 5 microamperes, minus 10 amperes, 15 amperes and 5 amperes. As before the target current $I_t$ decreases at time $t_1$ and successive current changes occur at the times previously considered. Because of the overdamped condition, the changes are increments in the direction of the final steady values, shown for $I_2$ and $I_b$ by broken lines S and T, respectively. Accordingly, the circuit equilibrium response time is seen to be about comparable to that in the operation of FIGURE 3B.

Figure 4:
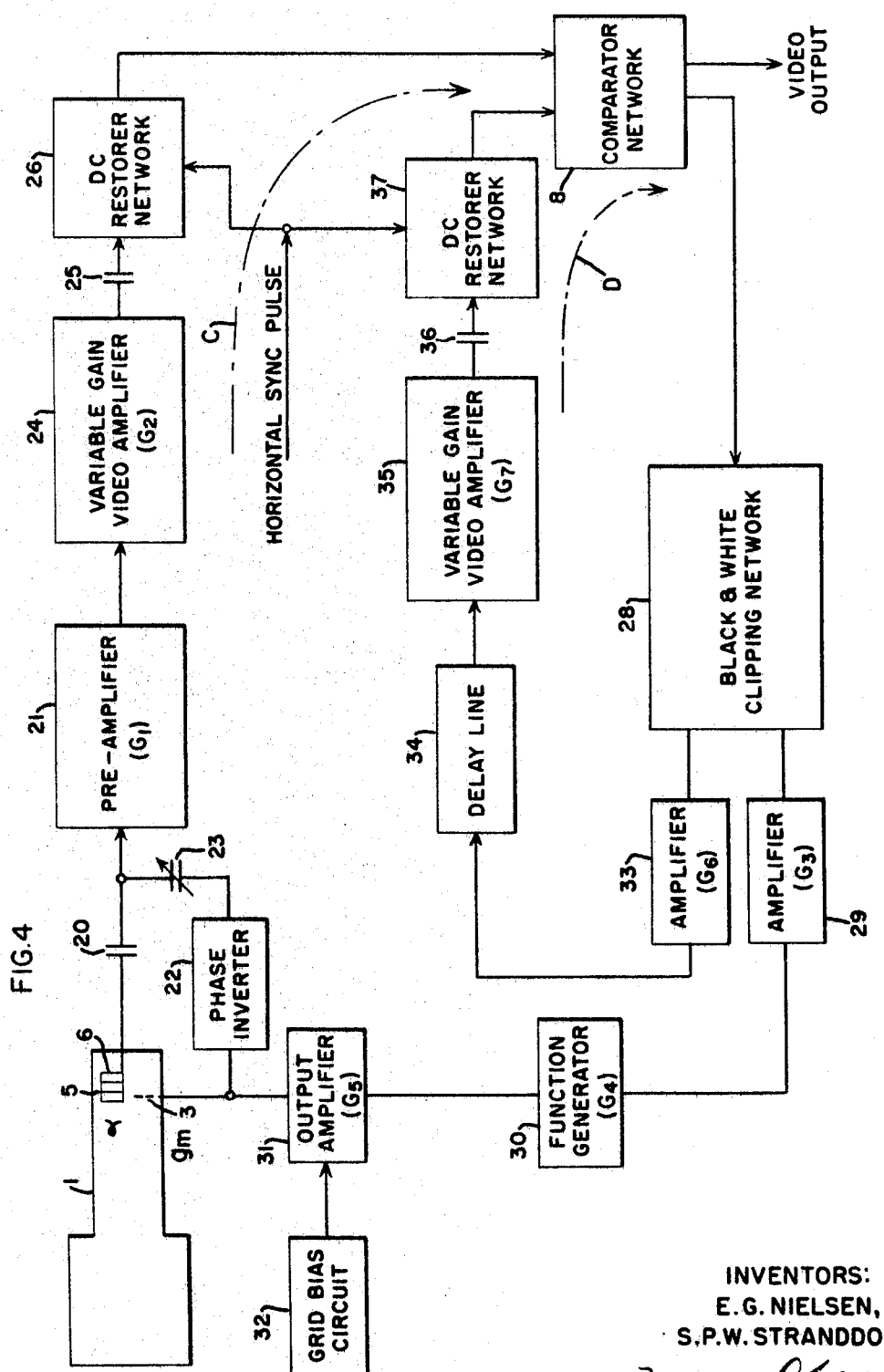
FIGURE 4 is a detailed block diagram of the invention.
Figure 6:
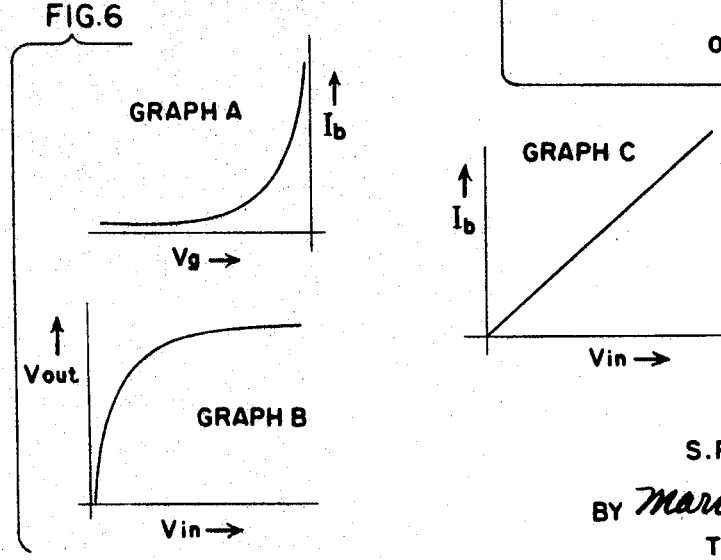
FIGURE 6 is a series of curves illustrating the transfer characteristic of the function generator of FIGURE 4, the transconductance of the camera tube of FIGURE 4 and the composite transfer characteristic resulting from combining the two.

Referring now to FIGURE 4, a detailed block diagram of an operative embodiment of the invention is presented. It may be seen that the circuit of FIGURE 4 conforms to the functional representation provided in FIGURE 1. Accordingly, in the primary feedback loop C, the anode electrode 6 of the tube 1 is connected through a D.C. blocking capacitor 20 to the input of a preamplifier 21. A connection is also made from the control grid 3 through a phase inverting network 22 connected in series with a compensating variable capacitor 23 to the input of preamplifier 21. The latter network serves to compensate, or cancel, the unwanted capacitive coupling normally existing between the control grid 3 and the anode 6. Preamplifier 21 preferably is of a shunt feedback type having a wide-band, wide dynamic range characteristic which will respond to the target signal with or without the automatic beam control being operative. The output of preamplifier 21 is connected to a variable gain video amplifier 24 of conventional type and the output thereof connected through a further D.C. blocking capacitor 25 to a D.C. restorer network 26. In a well known manner, the D.C. restorer network 26 establishes a D.C. reference level to the signal applied thereto, typically by fixing the black level at a reference D.C. value, so that the signal is always of a single polarity with respect to the reference level. The output of network 26 is connected as the first input to comparator network 8. One output of network 8 provides the video signal output of the system, normally coupled to a video amplifier, not shown. A second output from network 8 is connected to a black and white clipping network 28. Clipping network 28 is a conventional circuit which serves to confine the applied signal amplitude between an upper and lower limit so as to be within the capabilities of the circuit components. A first output from network 28 is coupled through an amplifier 29 to a function generator 30. Function generator 30 provides a nonlinear transfer impedance characteristic which compensates for the nonlinear transconductance $g_m$ of the camera tube 1 so that the tube transconductance appears as a linear quantity to the primary feedback loop, a linear relationship being established between control voltage at the input to function generator 30 and generated beam current. These characteristics are illustrated in FIGURE 6 and will be considered when describing the overall circuit operation. The function generator may be in the form of a diode-resistor matrix although other conventional function generator circuits providing the indicated transfer function may be used. The output of function generator 30 is connected through a wide-band output amplifier 31 to the control grid 3 for controlling the beam current intensity, output amplifier 31 also having applied thereto a source of bias potential 32. Although the bias may be established otherwise, it is normally applied so as to set the beam current at its minimum value with no control signal applied.

To complete the secondary feedback loop D, a second output from black and white clipping network 28 is connected through an amplifier 33 to a delay line 34. The output of delay line 34 is connected through a variable gain video amplifier 35, a D.C. blocking capacitor 36 and a D.C. restorer network 37, serially connected in the order recited, to a second input of comparator network 8. Delay line 34 introduces a delay approximately equivalent to the inherent delay of the tube 1 so that the delay of the primary and secondary feedback loops are about equal, which is desirable for the preferred operation. This delay $\tau_3$ is typically on the order of 150 nanoseconds.

A common input is applied to D.C. restorer networks 26 and 37, which are similar components, for synchronously establishing the D.C. reference levels in the primary and secondary feedback loops. This input is commonly derived from the horizontal sync pulse of the associated camera chain.

The components of the two feedback loops may be assumed to have transfer functions assigned as follows: in the primary feedback loop, preamplifier 21, $G_1$; video amplifier 24, $G_2$; amplifier 29, $G_3$; function generator 30, $G_4$; output amplifier 31, $G_5$; tube transconductance, $g_m$; electron multiplier 5, $\alpha$; and in the secondary feedback path, amplifier 33, $G_6$; and amplifier 35, $G_7$. The open loop gain of the primary feedback loop $k_1$ is then $\alpha g_m G_1 G_2 G_3 G_4 G_5$. The open loop gain of the secondary feedback loop $k_2$ is $G_6 G_7$. In accordance with the previously established constraints on the feedback circuit for the preferred embodiment, the open loop gains for the primary and secondary loops are equal in magnitude and opposite in phase so that $$\alpha g_m \ G_1 G_2 G_3 G_4 G_5 = -\frac{1}{m}$$

and $$G_6 G_7 = \frac{1}{m}$$

Considering now the operation of the circuit of FIGURE 4, as has been noted with respect to the circuit of FIGURE 1, the reflected current which carries the video information may be expressed as $I_b - I_t$. After several stages of amplification and processing this signal is applied to comparator network 8. In network 8 it is compared, in the embodiment being considered by being summed, with a signal fed back by means of the secondary feedback loop to provide an output signal conforming to the video information. Also, from the output of network 8 is derived the control signal that is fed back to the camera tube 1.

Figure 5:
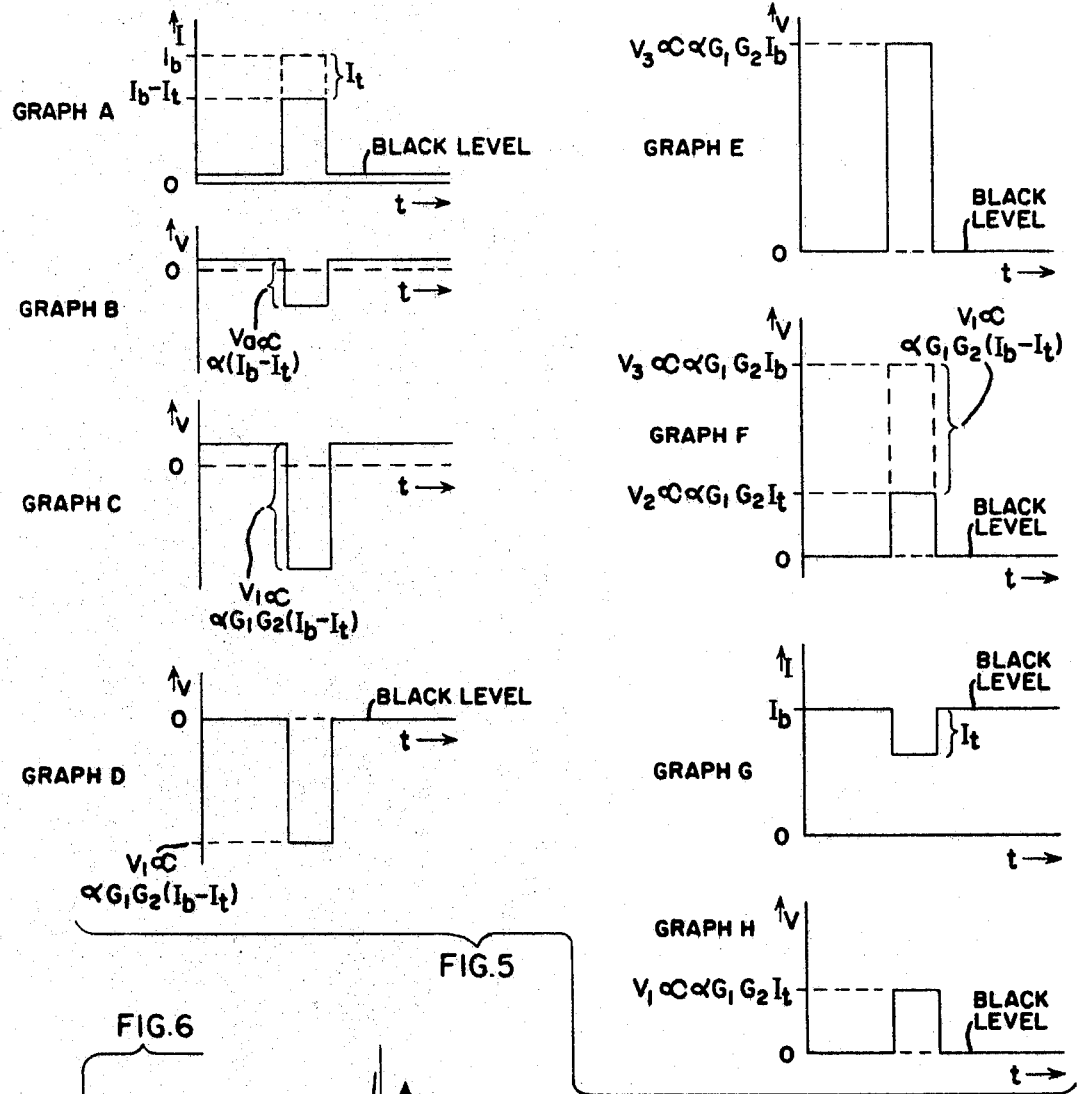
FIGURE 5 is a series of waveforms employed in explaining the operation of the circuit of FIGURE 4.

In Graph A of FIGURE 5 are illustrated superimposed the current waveforms $I_b$ and $I_t$ to provide $I_b - I_t$, where $m$ has a value of about .3. Olso indicated is the black level, which corresponds to the steady state beam current for zero target current. In Graph B of FIGURE 5 is illustrated the voltage waveform having a peak amplitude of $V_a$ proportional to $\alpha(I_b - I_t)$, as applied to the input of preamplifier network 21. This voltage is seen to be inversely related to the corresponding current waveform and has no fixed D.C. reference level, D.C. having been removed by the blocking capacitor 20. In Graph C is shown the voltage waveform at the output of amplifier 24, having a peak amplitude of $V_1$ proportional to $$\alpha G_1 G_2 (I_b - I_t)$$

which is seen to correspond to the waveform in Graph B with further amplification. In Graph D is illustrated the first input to network 8 taken from D.C. restorer network 26 which is the voltage of Graph C at an established D.C. reference level corresponding to the black level. The second input to summing network 8 is shown in Graph E, which is a voltage waveform having a peak amplitude $V_3$ proportional to $\alpha G_1 G_2 I_b$, corresponding to the amplified beam current component of the first input to network 8, but of inverse polarity. Delay line 34 ensures that the two inputs to network 8 are delayed by equal amounts in their respective paths. In addition, the two inputs are provided with fixed reference levels normally equal in value and of opposite polarity so that proper cancellation of the $I_b$ component of the first input occurs in summing network 8, and so that the output of network 8 is referenced to ground. Accordingly, at the output of summing network 8 is provided a voltage equal to the sum of the two inputs and therefore proportional to $I_t$, i.e., $\alpha G_1 G_2 I_t$, as shown in Graph F. The voltage at the output of summing network 8 forms the video output of the system and in addition is transformed into the control voltage $V_g$ applied to control grid 3, which control voltage has been compensated for nonlinearity of the tube transconductance $g_m$ by function generator 30.

In Graph A of FIGURE 6 is shown a typical transconductance characteristic of a camera tube in which is plotted the beam current $I_b$ versus the control voltage $V_g$. In Graph B of FIGURE 6 is illustrated the transfer characteristic $G_4$ of the function generator 30 showing a plot of the output voltage $V_{out}$ to the input voltage $V_{in}$. $V_g$ is related to $V_{out}$ by the bias offset provided by circuit 32 and the amplification factor $G_5$ of amplifier 31. The transfer function $G_4$ is dimensionless and when multiplied with the $g_m$ characteristic of the tube results in a linear relationship between $V_{in}$ and $I_b$, as illustrated in Graph C.

It is noted that as $I_b$ tracks $I_t$, its value may vary between some lower limit, shown in Graphs A to F of FIGURE 5 as the black level, and a given upper limit determined by the highest light intensity encountered or by the inherent tube characteristics. In the absence of the automatic beam control being effective, for example, if the feedback to the control grid is open either intentionally or inadvertently, or where the feedback circuit may come on after the tube 1 is in operation, a video signal proportional to $I_t$ is nevertheless provided at the output of the summing network 8. This signal is comparable to the video signal obtained with automatic beam control with respect to polarity but does not have the signal to noise characteristic or the fidelity for high brightness picture elements associated with automatic beam control.

Accordingly, if it is assumed that the automatic beam control is not functioning, the beam current is constant and is established at a high value for accommodating the brightest picture elements in accordance with the constraints previously described for constant beam operation. Accordingly, this value now becomes the reference or black level. The current $I_b - I_t$ is therefore represented as a negative pulse of a magnitude $I_t$ that is referenced to $I_b$, as shown in Graph G of FIGURE 5. A corresponding D.C. restored, amplified voltage $V_1$ proportional to $\alpha G_1 G_2 I_t$ and of opposite polarity to the current waveform is applied to summing network 8. This waveform is shown in Graph H. Since there is now no second input present to summing network 8, the output therefrom is the same as the singly applied input and is of the same polarity as in Graph F when considering the automatic beam control operation.

In the above discussion comparator network 8 is described as performing a summing function. Employed in this manner, it has been stated that the preferred operation of the circuit requires that the open loop gains of the primary and secondary feedback loops be equal in magnitude and opposite in phase. It should be recognized that the comparator network 8 may perform other functions such as a difference function in which case for optimum operation both the phase and magnitude of the respective loop gains need be equal. Whatever specific function is performed by the comparator network it should be clear that the open loop gains should be adjusted for providing operation in accordance with the principles herein recited.

Further, although the present circuit has been described basically as a two feedback loop circuit, additional ancillary feedback loops may be employed with respect to various portions of the circuit for obtaining additional control of the regulation and stability characteristics.

The appended claims are intended to include all modifications that fall within the true spirit and scope of the invention.

What we claim as new and desire to secure by Letters Patent of the United States is:

1. An automatic beam control system for controlling the beam current in a camera tube of the return beam read out type comprising:
    (a) a feedback circuit coupled between the output electrode and an input electrode of said tube,
    (b) said feedback circuit having a finite forward and backward transfer characteristic and including means for deriving and applying a control signal to said input electrode that is a function primarily of the target current of the tube, said control signal causing said beam current to vary in accordance with variations in the input light intensity to said tube.

2. An automatic beam control system for controlling the beam current in a camera tube of the return beam read out type wherein the tube output current includes a target current and a beam current component, comprising:
    (a) a feedback circuit coupled between the output electrode and an input electrode of said tube, the tube output current being applied to said circuit,
    (b) said feedback circuit including means for providing at least partial cancellation of said beam current component and thereby deriving a control signal that is a function primarily of the tube target current, said control signal being applied to said input electrode for causing said beam current to vary in accordance with variations in the input light intensity to said tube.

3. An automatic beam control system as in claim 2 wherein the transfer function of the control system $I_b/I_t$ is equal to $1/m$, $m$ having a value less than $M_{max}$, where $I_b$ is the beam current, $I_t$ is the target current, $m$ is a circuit factor and $M_{max}$ is the ratio of the target current to the minimum beam current required to sustain said target current.

4. An automatic beam control system for controlling the beam current in a camera tube of the return beam read out type wherein the tube output current includes a target current and a beam current component, comprising:
    (a) a feedback circuit including a primary feedback path coupled between the output electrode and a control electrode of said tube, the tube output current being applied to said circuit,
    (b) said feedback circuit including a closed feedback loop for providing at least partial cancellation of said beam current component and thereby deriving a control signal that is a function primarily of the tube target current, said control signal being applied to said control electrode for causing said beam current to vary in accordance with variations in the input light intensity to said tube.

5. An automatic beam control system for controlling the beam current in a camera tube of the return beam read out type wherein the tube output current includes a target current and a beam current component, comprising:
    (a) a feedback circuit including a primary feedback path coupled between the output electrode and a control electrode of said tube, the tube output current being applied to said circuit, said path being closed by said tube so as to form a primary feedback loop,
    (b) said feedback circuit further including a secondary feedback loop having a portion common to said primary feedback loop, said secondary loop feeding back a signal for at least partially cancelling out said beam current component and thereby deriving a control signal that is primarily a function of the tube target current, said control signal being applied to said control electrode for causing said beam current to vary in accordance with variations in the input light intensity to said tube.

6. An automatic beam control system as in claim 5 wherein the transfer function of the control system $I_b/I_t$ is equal to $1/m$, $m$ having a value less than $M_{max}$, where $I_b$ is the beam current, $I_t$ is the target current, $m$ is a circuit factor and $M_{max}$ is the ratio of the target current to the minimum beam current required to sustain said target current.

7. An automatic beam control system as in claim 6 wherein said primary feedback loop has an open loop gain of $$\frac{K-1}{m}$$

and said secondary feedback loop has an open gain of $$\frac{(m-1)K+1}{m}$$

where K is the open loop gain of said feedback circuit referenced to said common portion.

8. An automatic beam control system as in claim 7 wherein K is made to approach zero so that the open loop transfer characteristics of said primary and secondary feedback loops are approximately matched in magnitude and phase so as to provide essentially complete cancellation of said beam current component.

9. An automatic beam control system for controlling the beam current in a camera tube of the return beam read out type wherein the tube output current includes a target current and a beam current component comprising:
    (a) a feedback circuit including a primary feedback path coupled between the output electrode and a control electrode of said tube, the tube output current being applied to said circuit, said path being closed by said tube so as to form a primary feedback loop,
    (b) said feedback circuit further including a secondary feedback path coupled from a first point to a second point of said primary feedback path so as to form a secondary feedback loop having a portion common to said primary feedback loop, (c) means disposed at said second point having a first input thereto coupled from the output electrode and a second input thereto fed back through said secondary feedback path, said means comparing said first and second inputs so as to at least partially cancel out the beam current component of the tube output current for providing a video output signal that is primarily a function of the tube target current, and (d) means included in said primary feedback path for deriving from said output signal a control signal that is applied to said control electrode for causing said beam current to vary in accordance with variations in the input light intensity to said tube.

10. An automatic beam control system as in claim 9 wherein the transfer function of the control system $I_b/I_t$ is equal to $1/m$, $m$ having a value less than $M_{max}$, where $I_b$ is the beam current, $I_t$ is the target current, $m$ is a circuit factor and $M_{max}$ is the ratio of the target current to the minimum beam current required to sustain said target current.

11. An automatic beam control system as in claim 10 wherein the open loop gains of said primary and secondary feedback loops are approximately matched in magnitude and phase so as to provide essentially complete cancellation of said beam current component.

12. An automatic beam control system for controlling the beam current in a camera tube of the return beam read out type wherein the tube output current includes a target current and a beam current component, comprising:

(a) a feedback circuit including a primary feedback path coupled between the output electrode and a control electrode of said tube, said path being closed by said tube so as to form a primary feedback loop, (b) said primary feedback path including in the order recited a wideband amplifier network and a comparator network, the tube output current being coupled through the amplifier network as a first input to said comparator network, (c) said feedback circuit further including a secondary feedback path coupling back the output of said comparator network as a second input thereto so as to form a secondary feedback loop having a portion common to said primary feedback loop, said comparator network providing at least partial cancellation of the beam current component of the tube output current and thereby supplying a video signal that is primarily a function of the tube target current, and (d) means included in said primary feedback path for deriving from said video output signal a control signal that is applied to said control electrode for causing said beam current to vary in accordance with variations in the input light intensity to said tube.

13. An automatic beam control system as in claim 12 wherein the transfer function of the control system $I_b/I_t$ is equal to $1/m$, $m$ having a value less than $M'_{max}$, where $I_b$ is the beam current, $I_t$ is the target current, $m$ is a circuit factor and $M_{max}$ is the ratio of the target current to the minimum beam current required to sustain said target current.

14. An automatic beam control system as in claim 13 wherein the open loop gains of said primary and secondary feedback loops are approximately matched in magnitude and phase so as to provide essentially complete cancellation of said beam current component.

15. An automatic beam control system as in claim 14 which includes means coupled within a portion of said primary feedback path that is uncommon to said secondary feedback loop for compensating for a nonlinearity the tube transconductance characteristic so that the transconductance characteristic effective in the primary feedback loop is approximately linear.

References Cited

UNITED STATES PATENTS

| | | | |
|---|---|---|---|
| 2,987,645 | 6/1961 | Hudgins | 178—7.2 XR |
| 3,308,235 | 3/1967 | Greiner et al. | 178—7.2 |
| 3,315,034 | 4/1967 | White | 178—7.2 |
| 3,316,349 | 4/1967 | Loughlin | 178—7.2 |

OTHER REFERENCES

Luther—RCA Technical Note No. 389: Image Orthicon Automatic Beam and Gain Control, 1 p. dwg., 1 p. spec., June 1960, 178-7.1 D.C.

ROBERT L. GRIFFIN, *Primary Examiner.*

R. L. RICHARDSON, *Assistant Examiner.*